(12) United States Patent
Gilmartin

(10) Patent No.: US 7,623,548 B2
(45) Date of Patent: Nov. 24, 2009

(54) METHODS, SYSTEMS, AND COMPUTER PROGRAM PRODUCTS FOR MANAGING ACCESS RESOURCES IN AN INTERNET PROTOCOL NETWORK

(75) Inventor: Neil Gilmartin, Atlanta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 481 days.

(21) Appl. No.: 11/317,055

(22) Filed: Dec. 22, 2005

(65) Prior Publication Data

US 2007/0147346 A1 Jun. 28, 2007

(51) Int. Cl.
H04J 3/22 (2006.01)
G06F 15/173 (2006.01)

(52) U.S. Cl. ........................................ 370/468; 709/226

(58) Field of Classification Search .................. 370/229, 370/230, 252, 254, 395.2, 395.21, 395.41, 370/395.43, 395.52, 468; 709/223, 226–229
See application file for complete search history.

(56) References Cited

U.S. PATENT DOCUMENTS

| | | | | |
|---|---|---|---|---|
| 6,449,588 B1 * | 9/2002 | Bowman-Amuah | | 703/21 |
| 6,459,702 B1 * | 10/2002 | Saaverda et al. | | 370/468 |
| 6,636,505 B1 * | 10/2003 | Wang et al. | | 370/352 |
| 6,973,033 B1 * | 12/2005 | Chiu et al. | | 370/230.1 |
| 7,058,716 B1 * | 6/2006 | Sundaresan et al. | | 370/468 |
| 7,281,046 B1 * | 10/2007 | Sunderasan et al. | | 709/226 |
| 2002/0039352 A1 * | 4/2002 | El-Fekih et al. | | 370/252 |
| 2002/0101881 A1 * | 8/2002 | Sundaresan et al. | | 370/468 |
| 2002/0138603 A1 * | 9/2002 | Robohm | | 370/259 |
| 2002/0141427 A1 * | 10/2002 | McAlpine | | 370/413 |
| 2003/0123446 A1 * | 7/2003 | Muirhead et al. | | 370/392 |
| 2004/0047354 A1 * | 3/2004 | Slater et al. | | 370/400 |
| 2004/0153545 A1 * | 8/2004 | Pandya et al. | | 709/226 |
| 2005/0041576 A1 * | 2/2005 | Couturier et al. | | 370/229 |
| 2005/0066036 A1 * | 3/2005 | Gilmartin | | 709/226 |
| 2005/0226251 A1 * | 10/2005 | Krzanowski et al. | | 370/395.41 |
| 2006/0133418 A1 * | 6/2006 | Anand | | 370/468 |
| 2006/0265490 A1 * | 11/2006 | Pishevar et al. | | 709/223 |
| 2008/0013531 A1 * | 1/2008 | Elliott et al. | | 370/356 |

* cited by examiner

Primary Examiner—Ayaz R Sheikh
Assistant Examiner—Timothy J Weidner
(74) Attorney, Agent, or Firm—Cantor Colburn LLP

(57) ABSTRACT

Exemplary embodiments relate to methods, systems, and computer program products for managing access resources in an Internet protocol network. Methods include receiving a request for IP network service, the request including a required class of service. A storage device that specifies routers and resources available on the routers is accessed. A router and a port on that router are selected from the specified routers to perform the requested service. The selecting includes verifying that the resources available on the selected router and port can perform the requested service. Instructions are transmitted to a network configuration system to activate the requested service on the selected router and port. The instructions specify a quality of service corresponding to the required class of service. The storage device is updated to reflect the requested service being activated on the selected router and port.

19 Claims, 5 Drawing Sheets

METHODS, SYSTEMS, AND COMPUTER PROGRAM PRODUCTS FOR MANAGING ACCESS RESOURCES IN AN INTERNET PROTOCOL NETWORK

BACKGROUND

Exemplary embodiments relate generally to Internet protocol (IP) networks, and more particularly, to methods, systems and computer program products for managing access resources in an IP network.

IP networks with quality of service (QoS) have the capability of handling traffic in a differentiated manner so that the service providers (SPs) can offer different levels of QoS. This means that the customer user is assured by the SP that from each access site, the user can send information packets at specified rates with certain bursting characteristics and delivery qualities relating to latency, jitter, packet loss, etc.

One of the problems for the SP is to be able to clearly define the services to be offered with their QoS characteristics and present them in service order (SO) language defining the services, packages and so on. This language must then be translated into the parameters and values that can drive the logic and controls of an operation support system (OSS) provisioning system. The OSS provisioning system must be aware of the resources the SP has available to provide these services, and be able to account for these resources as customers grow, change or delete their services. All of this data must be constantly updated to the network that supports the service and provides the resources being managed.

As a customer transmits packets of data (containing for e.g., data, voice, and video information) into the network, each router must know exactly how to police the incoming traffic, how to place packets into QoS queues, how to handle packets that are "out of contract" (i.e., above contractually assured traffic limits), how to route the packets, and how to assure that there is no cross-talk between users (i.e., that no users can listen in on data being transmitted for another customer.

Currently, managing the resources that provide access to an IP network with QoS is largely a time consuming and manual process. It would be desirable to be able to provide an automated method for allocating resources to a customer service in an IP network with QoS. In addition, it would be desirable to manage these resources throughout the life of the service as it changes over time.

SUMMARY

Exemplary embodiments relate to methods, systems, and computer program products for managing access resources in an Internet protocol network. Methods include receiving a request for IP network service, the request including a required class of service. A storage device that specifies routers and resources available on the routers is accessed. A router and a port on that router are selected from the routers specified to perform the requested service. The selecting includes verifying that the resources available on the selected router and port can perform the requested service. Instructions are transmitted to a network configuration system to activate the requested service on the selected router and port. The instructions specify a quality of service corresponding to the required class of service. The storage device is updated to reflect the requested service being activated on the selected router and port.

Systems for managing access resources in an Internet protocol network include an input device, an output device and a processor in communication with the input and output devices. The input device receives a request for IP network service, the request including a required class of service. The processor includes computer instructions for facilitating accessing a storage device that specifies routers and resources available on the routers. A router and a port on that router are selected from the specified routers to perform the requested service. The selecting includes verifying that the resources available on the selected router and port can perform the requested service. The storage device is updated to reflect the requested service being activated on the selected router and port. The output device transmits instructions to a network configuration system to activate the requested service on the selected router and port. The instructions specify a quality of service corresponding to the required class of service.

Computer program products for managing access resources in an Internet protocol network include a storage medium readable by a processing circuit and storing instructions for execution by the processing circuit for facilitating a method. The method includes receiving a request for IP network service, the request including a required class of service. A storage device that specifies routers and resources available on the routers is accessed. A router and a specific port on that router are selected from the specified routers to perform the requested service. The selecting includes verifying that the resources available on the selected router and port can perform the requested service. Instructions are transmitted to a network configuration system to activate the requested service on the selected router and port. The instructions specify a quality of service corresponding to the required class of service. The storage device is updated to reflect the requested service being activated on the selected router and port.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments include a method for managing access router resources in an Internet protocol (IP) network with quality of service (QoS). The resources managed include variable resources that vary depending on the number and types of equipment (e.g., bandwidth "BW") and fixed resources that are fixed by the type of equipment. Examples of fixed resources include, but are not limited to: the number of virtual private networks (VPNs), routing and forwarding (VRF) tables, route targets (RTs), routings distinguishers (RDs), policy maps, policers, access queues, IP security (IPSec) sessions, and point to point protocol (PPP) sessions a given router can provide.

Exemplary embodiments provide a very flexible, parameter-driven process for defining the accounting for resources as assignments in the network are designed to provide a customer with an IP-based service (e.g. direct Internet access (DIA) and IP/VPN access). Resources are allocated to the customer's service and managed throughout the life of the services as it changes over time and eventually is deleted from the network.

Figure 1:
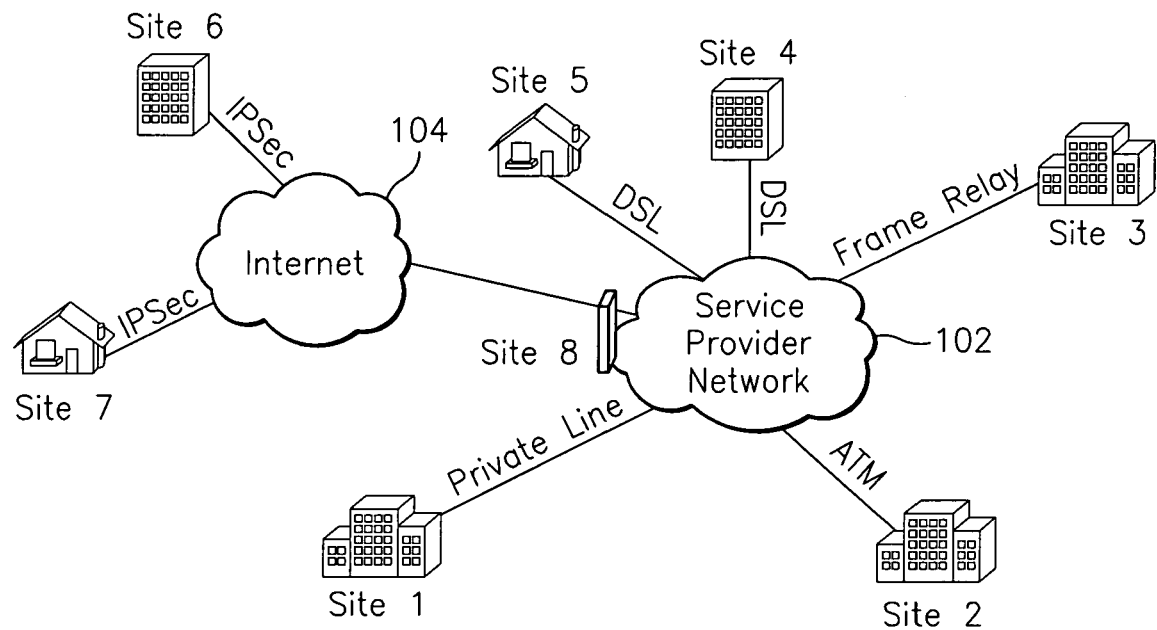
FIG. 1 is a block diagram of an exemplary network environment with access resources that may be managed according to exemplary embodiments.

FIG. 1 is a block diagram of an exemplary network environment that includes access resources that may be managed according to exemplary embodiments. The network environment includes two networks: a service provider network 102 and the Internet 104. In addition, FIG. 1 depicts several sites being connected (in a variety of manners) to the service provider network 102 or to the Internet 104. The example connections include, but are not limited to, a private line connection, an asynchronous transfer mode (ATM) connection, a frame relay connection, two digital subscriber line (DSL) connections, two IPSec connections, and a cable connection. In addition, the service provider network 102 and the Internet 104 are connected with each other, with a firewall on the service provider network 102 side of the connection. Using a network environment such as the one depicted in FIG. 1, an authorized user from any of the sites will be able to transfer data and/or voice to any of the other sites. In exemplary embodiments the service provider is a telephone company with a service provider network 102 that has been built on broadband technology. This broadband technology is utilized as a base to provide the newer voice services to customers.

Figure 2:
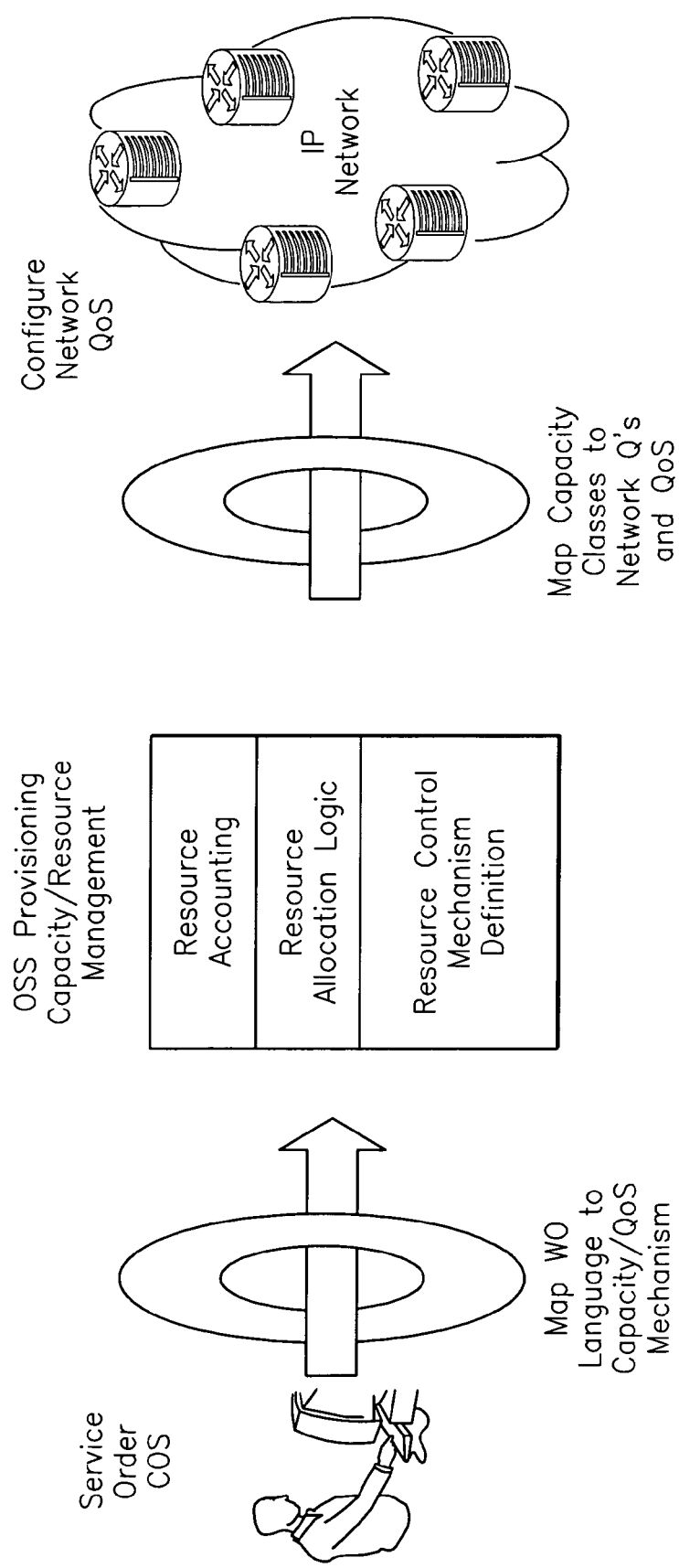
FIG. 2 is an overview of a system and process for managing access resources in an Internet Protocol (IP) network in accordance with exemplary embodiments.

FIG. 2 is an overview of a system and process for managing access resources in an IP network that may be implemented by an operational support system (OSS) in accordance with exemplary embodiments. A service order (SO) (including a class of service (COS)) is received from a customer. Next, a work order (WO) is created from the service order and entered into the OSS by a customer service representative 302 (shown in FIG. 3). In alternate exemplary embodiments the WO is received electronically and/or directly from the customer requesting the service. Exemplary embodiments provide a mapping of the language of the WO to the capacity accounting mechanisms used to define, tally, allocate and manage the network's resources. The mechanism maintains awareness of the amount of available resources, the resources required to fulfill a given service request, the reservation of these resources, and the maintenance and reporting of the resources. Exemplary embodiments also facilitate the end of process of initiating, changing and deleting services which entails the mapping from the capacity mechanisms to the commands and codes communicated with the network routers so they are configured properly to provide the given services.

The COS language in the WO is mapped to the capacity classes and the logic of the services to be provided. The services are designed and resources allocated and accounted for. Then, the network is configured with the designated resources to provide the service at the QoS purchased.

Exemplary embodiments assume that a mechanism such as a computer system (e.g., an OSS) is capable of maintaining an inventory of the equipment utilized in IP networks, has the logic to design IP services using this inventory, is programmed to provide the processing described herein, can be programmed to map COS language to the mechanisms of the method, and can communicate configurations to an IP network.

IP packets are transmitted across an IP network making use of a field in the header of the packet called the type of service (TOS) bits. These bits allow for values from 0 to 7 and routers examine these bits to determine the priority, queues, and methods for handling the packets. Based on these eight possible values, exemplary embodiments provide for users of the OSS to define up to eight capacity classes. In exemplary embodiments, the users can specify, for each class: the name of the class; a percentage of the BW of a managed entity that will be allocated to this class; a subscription factor that will allow over subscription or enforce under subscription of the class; and major and minor thresholds that will cause alerts to be issued when these thresholds have been crossed.

Exemplary embodiments also provide for the pre-allocation of the BW (i.e., prior to the above allocation to the classes) to remove part of an entity's BW capacity from consideration, taking into account one or more of the following: overhead factors since the payload of a port or router is always lower than its theoretical speed; a redundancy factor to set aside resources to cover failure cases; and an unmanaged services factor since the OSS may not manage off of the services that are fun across the network it manages.

Exemplary embodiments assume that resources will be managed at the provider edge routers (PEs) in service provider (SP) data centers and therefore the above mechanism will be implemented for these routers, certain ports on these routers, the data center as a whole and other logical entities designated for special services. This allows the OSS to make assignments related to WOs based on the amount of traffic that customer is buying for this service. This customer's traffic is then tallied with all other customers and the totals are managed such that no customer can usurp the resources planned for other customers and the network as a whole can be managed to avoid hot spots, congestions, interference of some customers by others and so on. The OSS will provide templates for all the types of equipment used in the PEs of the SP (e.g., router, card, port types) and these templates designate the amount of BW and the numbers of fixed resources this type of equipment will provide. The users define the topology of their network in the OSS inventory for their areas of services. As equipment is defined, the resources designated in the templates are tallied and allocated into the BW capacity mechanism above and into the counters for fixed resources at the appropriate levels. These then are the "money in the bank" that can be used to provide services to end user of the network services and debited from the available resource counts as each service is designed by the OSS.

With the OSS set up, the topology of the network defined and resources allocated into resource counters and capacity classes, the OSS user defines the service to be provided to the OSS, mapping the words defining the service and COS of the service to the capacity classes and logic of the system design logic. For example, if the end customer wants an IP connection from this point to that point with a speed of 10 megabits/second and a COS level of "gold" in this direction and 20 megabits/second in the other direction with a COS level of "silver", all based on frame relay technology. The frame relay PVCs and the IP connections across the network can be configured such that the 10 Megabits of gold traffic are scheduled into faster queues with higher reliability than the 20 Megabits of silver that are scheduled into a mix of lower speed queues. This would be desirable if, for example, the traffic the customer expects has more voice or video in the gold direction and more data or email in the other.

Figure 3:
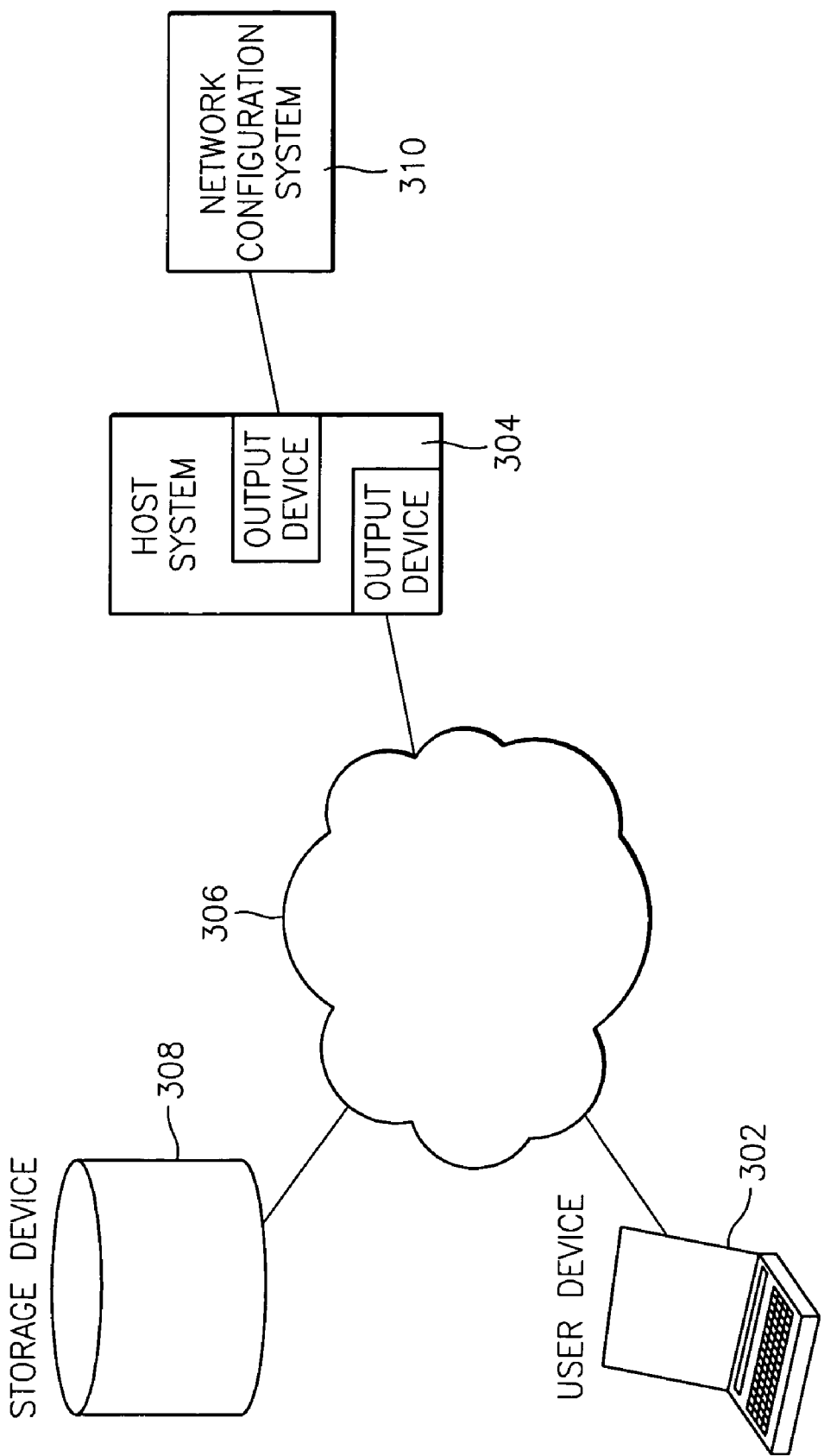
FIG. 3 is a block diagram of a system that may be utilized to manage access resources in an IP network in exemplary embodiments.

FIG. 3 is a block diagram of a system that may be utilized to manage access resources in an IP network in exemplary embodiments. The system includes one or more user devices 302 through which requestors (e.g., a customer service representative) at one or more geographic locations may contact the host system 304 to access the OSS described herein. In exemplary embodiments, the host system 304 includes a processor to execute the OSS to perform the functions described herein. The OSS may be implemented by software and/or hardware components. The OSS system is in communication with a network configuration system 310 for making the actual changes to the network configuration based on instructions from the OSS. In exemplary embodiments, the user devices 302 are coupled to the host system 304 via a network 306. Each user device 302 may be implemented using a general-purpose computer executing a computer program for carrying out the processes described herein. The user devices 302 may be personal computers, lap top computers, personal digital assistants, cellular telephones, host attached terminals, etc. with user interfaces for communicating with the OSS. The user interfaces may be implemented by interface screens, audio technology, voice recognition technology, or any other technology to allow the user to communicate with the OSS. If the user devices 302 are personal computers (or include the required functionality), the processing described herein may be shared by a user device 302 and the host system 304 (e.g., by providing an applet to the user device 302) or contained completely within one or more of the user devices 302.

The network 306 may be any type of known network including, but not limited to, a wide area network (WAN), a local area network (LAN), a global network (e.g. Internet), a virtual private network (VPN), and an intranet. The network 306 may be implemented using a wireless network or any kind of physical network implementation. A user device 302 may be coupled to the host system 304 through multiple networks (e.g., intranet and Internet) so that not all user devices 302 are coupled to the host system 304 through the same network. One or more of the user devices 302 and the host system 304 may be connected to the network 306 in a wireless fashion.

The storage device 308 may be implemented using a variety of devices for storing electronic information. It is understood that the storage device 308 may be implemented using memory contained in the host system 304 or the user device 302 or it may be a separate physical device. The storage device 308 is logically addressable as a consolidated data source across a distributed environment that includes a network 306. Information stored in the storage device 308 may be retrieved and manipulated via the host system 304. The storage device 308 includes OSS data such as the access routers and the resources available on these routers. The storage device 308 may also include other kinds of data such as system logs and user access profiles. In exemplary embodiments, the host system 304 operates as a database server and coordinates access to application data including data stored on storage device 308.

The host system 304 depicted in FIG. 1 may be implemented using one or more servers operating in response to a computer program stored in a storage medium accessible by the server. The host system includes an input device for receiving The host system 304 may operate as a network server (e.g., a web server) to communicate with the user device 302. The host system 304 handles sending and receiving information to and from the user device 302 and can perform associated tasks. In addition, the host system 304 also communicates with the network resources to cause the requested service to be added to the network. The host system 304 may also include a firewall to prevent unauthorized access to the host system 304 and enforce any limitations on authorized access. For instance, an administrator may have access to the entire system and have authority to modify portions of the system. A firewall may be implemented using conventional hardware and/or software.

The host system 304 may also operate as an application server. The host system 304 executes one or more computer programs (e.g., via a processor on the host system 304) to implement the OSS. Processing may be shared by the user device 302 and the host system 304 by providing an application (e.g., java applet) to the user device 302. Alternatively, the user device 302 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions. The input device in the host system 304 may be implemented by a receiver for receiving data (e.g., a request) over the network 306 or via the user device 302. The output device in the host system 304 may be implemented by a transmitter for transmitting data (instructions) over the network 306 or to the user device 302. Alternatively, the input device and/or output device may be implemented by reading from and writing to a storage location on the host system 304 and/or the storage device 308.

Figure 4:
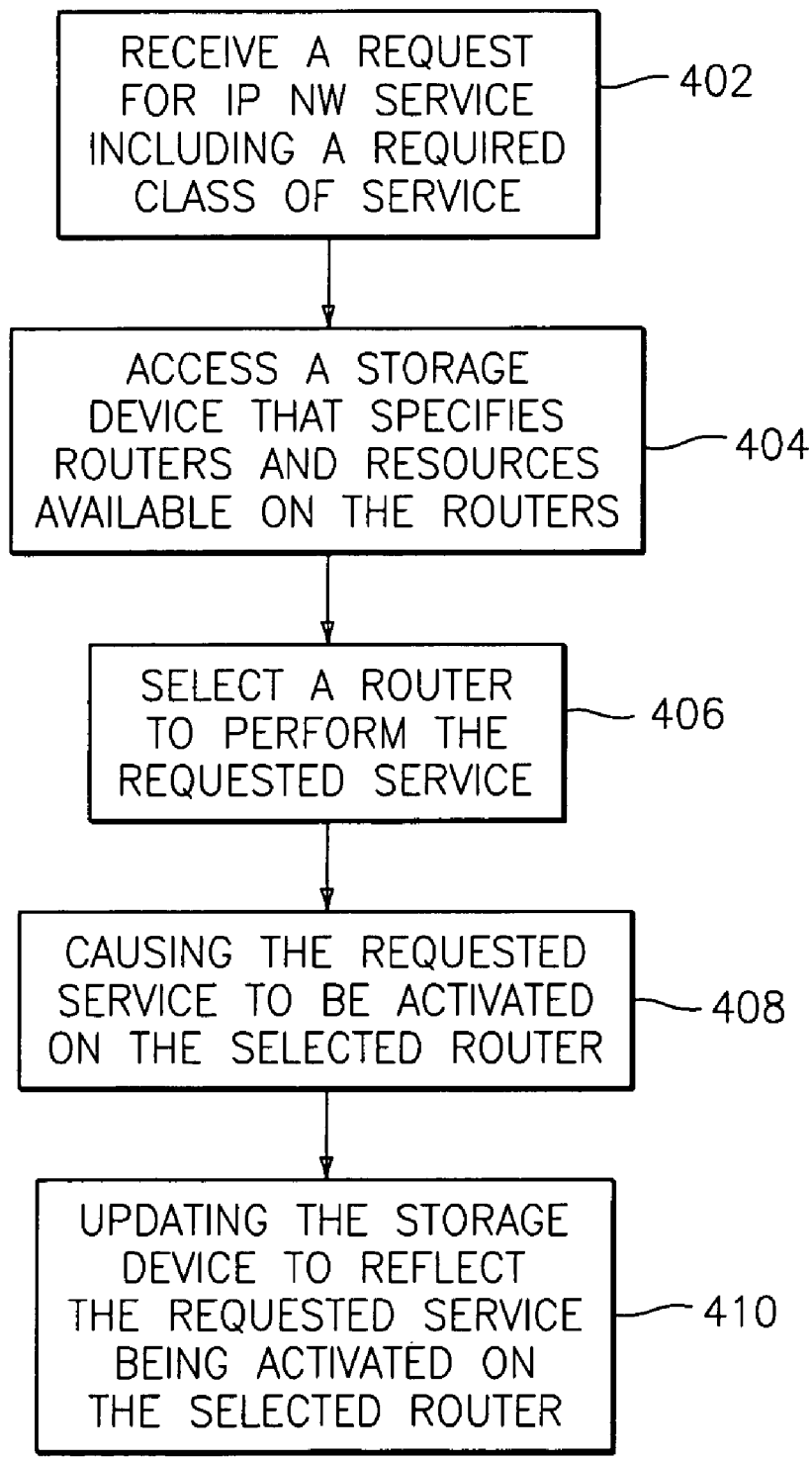
FIG. 4 is an exemplary embodiment of a process flow that may be utilized to manage access resources in an IP network.

FIG. 4 is an exemplary embodiment of a process flow that may be utilized to manage access resources in an IP network. In exemplary embodiments, the process flow is implemented by the OSS described herein. At block 402, a request for IP network service is received by the OSS. The request for service includes a required class of service (COS). As described previously, the WO language in the request for service is translated into capacity/QoS language for use processing by the OSS. At block 404, the system (i.e., OSS) accesses the storage device 308 that specifies routers and resources available on the routers for the IP network. At block 406, the system selects a router to perform the requested service. Part of the selecting verifies that the selected router has the resources to perform the requested service. Examples of how the router is selected are described below herein. At block 408, the system causes the requested service to be activated on the selected router. This may be performed by transmitting a command to a network configuration system 310. At block 410, the storage device is updated to reflect that the requested service has been activated on the selected router.

Figure 5:
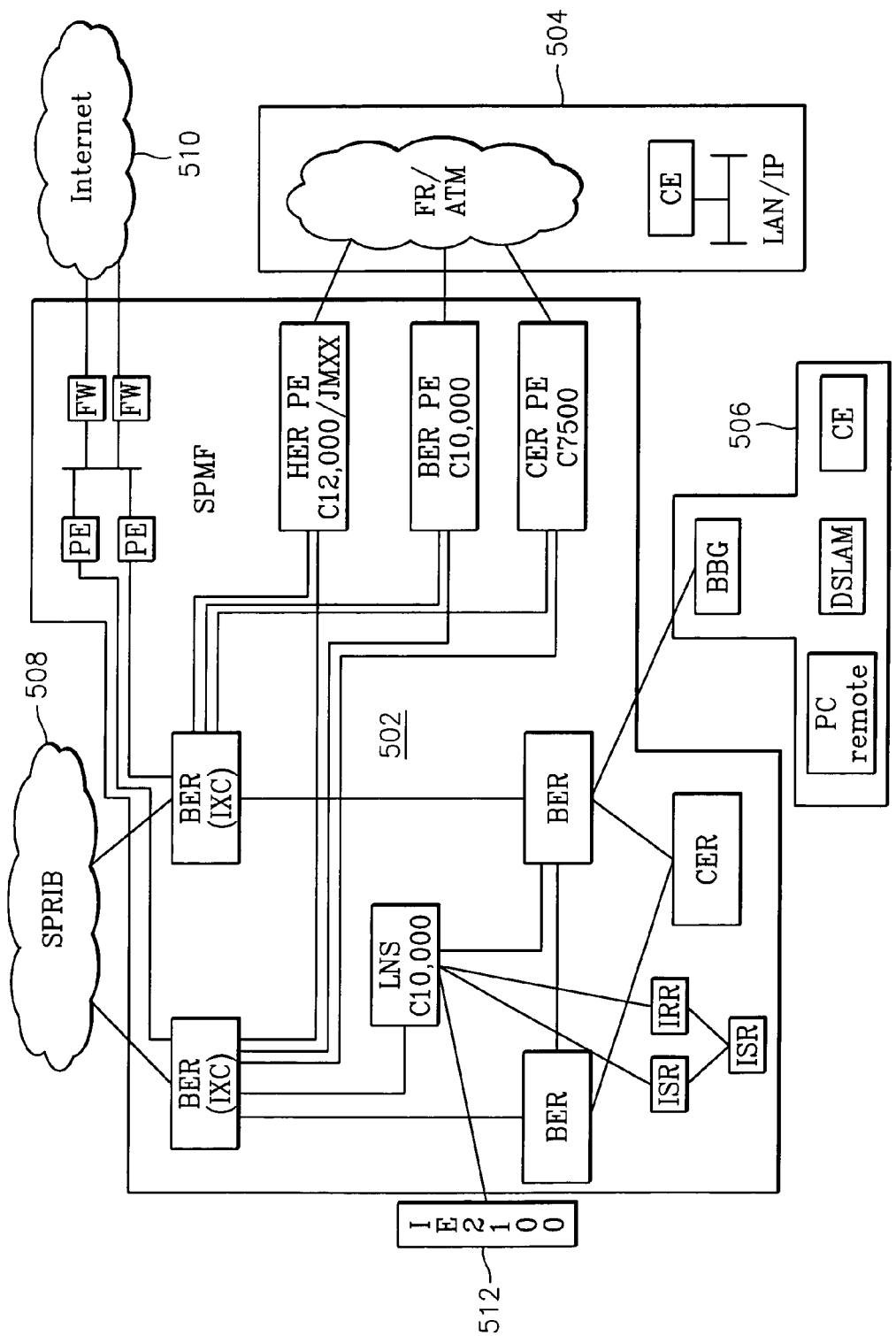
FIG. 5 is a block diagram of an exemplary network environment that includes a service provider managed facility that has access routers that may be managed by exemplary embodiments.

FIG. 5 is a block diagram of an exemplary network environment that includes a service provider managed facility including access routers. FIG. 5 includes a service provider managed facility 502 (SPMF) that includes several routers for moving voice and data from one location to another. An SPMF is commonly known in modern telecommunications as a data center. It is the data communications equivalent of the older voice world central office. The various router names in the picture (LNS, BER, ISR, IRR, CER, HER) are not important per se but represent a variety or routers of different size and providing different functions or services. Customers may enter the SPMF 502 via the scenario depicted in block 504.

This includes a local area network (LAN) in communication with a customer edge router (CE) which is in communication with a FR or ATM network. The FR or ATM network is in communication with three provider edge routers in the SPMF 502. According to exemplary embodiments, each of these connections is subdivided into eight smaller pipes that receive different priorities of service. Alternatively, a customer may access the SPMF 502 via the scenario depicted in block 506. Block 506 includes a customer connected via a remote PC or a CE into a DSLAM which is connected to the SPMF 502 via a BBG. According to exemplary embodiments, block 506 represents a Digital Subscriber Line (DSL) connection in which an ATM network carries the customer's data between the customer's equipment and a central broadband gateway (BBG) where the ATM traffic of many customer's is bundled together in a high capacity IP connection for transport to the IP carrier's network. The core of a service provider's IP network is the set of very high capacity, long-haul IP connections that provide the IP highways between geographically dispersed SPMFs. This is called the 'backbone', depicted in FIG. 5 as the Service Provider Routed IP Backbone (SPRIB). The SPRIB 508 is utilized to allow the customer to talk to someone in another city via another SPMF. The IE2100's in block 512 allows the SP to communicate with the customer's CE to update and manage this equipment for the customer. In addition, the customer (e.g., from box 504 and from box 506) may talk or transfer data via the Internet 510.

The subsequent paragraphs provide more details about exemplary embodiments that may be implemented and/or facilitated by the OSS (also referred to as the "system"). Where existing applications to perform required functions are available, the OSS may invoke them to perform all or part of the functions described herein. Where existing applications to perform required functions are not available the computer code to perform the functions is located in the OSS.

In exemplary embodiments, provisioning for DIA and IP VPN includes:

A. Receipt, verification and analysis of WOs.

B. Design and assign (D&A) of the services requested in the WOs. D&A will include capacity and resource availability management and other rules based logic for best management of PEs and the access trunks to PEs.

C. Assignment of inventory objects with object creation, modification and deletion as required, capacity and resource commitments to the database, management of all associations and relations between inventoried objects, and status management of all objects.

D. WOs to be provisioned include new orders, disconnect orders and "move, add and change" (MAC) orders for DIA and IP VPN services. For dedicated access, methods such as, but not limited to, frame relay (FR), ATM and private lines are available. For non-dedicated access, methods such as, but not limited to, IPsec, DSL site-to-site and remote access are available. Various combinations of access to the network are possible with the lowest access having the SP provide only the port as access to the SP's network. In other cases the SP provides the access port and the circuits from this port out to the customer's site. The full package is for the SP to provide the access port, the access circuit and the customer's CE (the router at the Customer's locations, i.e., the Customer Premise Equipment or CE.

E. Provisioning for inward orders will assemble (not committed to database yet) the physical, logical, and service inventory objects for the connection from the customer to the FR or ATM cloud or the customer end of the private line, and IPsec and DSL site-to-site and remote access. Provisioning calls the D&A processes (performed and/or facilitated by the OSS in exemplary embodiments) to design accesses considering the service request, access type, access speed, BW requirements, COS, and available resources. For dedicated access, the best connection from the FR/ATM cloud or PL into the service provider managed facility (SPMF) to a PE is chosen. For non-dedicated access, the best service module (SM) to serve this DSL or IPsec access is chosen. (Service Modules may provide other services in the future). Note that the term "best" is defined in later requirements but generally refers to the connection on a preferred type of equipment, respecting user defined priorities and fulfilling resource requirements.

G. Set up/remove Firewall connections.

H. Set up/remove Management PE/CE connections for managed sites of a VPN.

I. For DIA service, assure appropriate IP addresses (from the customer or from the service provider for the local area network (LAN) and from the service provider for the wide area network (WAN) and generate packet filters and static routes.

J. For VPN service, select/create/modify appropriate VRFs, RTs, RD, static routes, WAN, LAN, Loop Back, IPsec and DSL Remote pool IP addresses and subnets.

K. Create new objects as required: customer location(s), IP pools and customer circuits.

L. Assure data sets for activations and other uses such as communications with other Systems (e.g., Radius, CAFE, SOEG, WFM, and so on).

M. New and modified objects are handed back to the provisioning processes that invoked this D&A.

N. Provisioning receives the results of the D&A process and reacts to the success or fail of the D&A process. If the D&A process is successful, provisioning commits all objects to the database and signals this success with appropriate information to the WO or calling process. If the D&A process failed, provisioning will not commit changes to the database, will see to rollback if any is required, and will message the calling process and others as appropriate. Provisioning for outward orders consists of clean up of deleted and/or cancelled objects. Provisioning for outward orders is not invoked for the de-activation of the service but only for the de-allocation of the service as a manual or scheduled event some configurable time after the deactivation. Everything is left intact for time with the service turned off via deactivation of the service in the network. When the configurable amount of time has elapsed, either by schedule or manual invocation, D&A recalculates the resource counters to be changed through release of the resources assigned to this service and gives the results back to provisioning.

O. Provisioning receives the results of the D&A calculations. Provisioning then commits the revised counters to the database; deletes all inventory objects that do not persist outside of services; releases inventory objects that do persist beyond being in service; and restores resources to available. Provisioning for both inward and outward orders produces the configuration information that is handed (e.g., transmitted) to an activation module for causing the indicated updates to the network elements (NEs). This also includes updates to the customer's customer edge router (CE) when that is typically managed by the service provider as part of the service.

MAC orders are moves, adds and changes to existing services. These same actions against current WOs are called correction passes.

A multi-protocol label switching (MPLS) VPN is based on an Internet Engineering Task Force (IETF) specification, Request For Comments (RFC) 2547 bis. In this RFC, the basic MPLS protocol has been enhanced to support VPN mechanisms. These mechanisms include VPN routing and forwarding (VRF) table, route target (RT) and route distinguisher (RD). VRFs, RDs, and RTs are supported in PE routers, not in other network routers or CE routers.

VRF table. There can be one or more VRFs (also comparable to a virtual router) per VPN that constitute a VPN. A VRF contains the set of routes that are available to a set of sites that are part of the VPN. If all sites in the VPN participate in only that VRF and no other VRF, all PEs will contain routes such that all sites are able to reach all other sites in the VPN. This topology is called a 'full mesh' topology. However, a VPN can have multiple VRFs defined such that each site might be limited in the set of other sites it can send messages to or receive messages from. This requires creation of multiple VRFs for the VPN, configuring them on the PEs supporting the VPN, and associating them appropriately with the sub-interfaces of those PEs. A sub-interface interfaces with a customer site interface. If two or more VPNs have a common physical site, separate sub-interfaces must be created and IP address space must be unique amongst these VPNs. For phase 1B, the System will support full mesh VRFs such that there is only one VRF per VPN.

RT. Each VPN has import route targets and export route targets (RT). These are different than IP routes/prefixes, however, are closely related to IP routes. The import RT associated with a VRF dictates which routes the VRF should import upon arrival of Multi-Protocol internal Border Gateway Protocol (MP-iBGP) route updates. Each IP VPN route that is injected into MP-iBGP is associated with one or more export RTs indicating which VPNs the route belongs to. The value of this attribute depends on the VPN topology. For a full meshed (MP-iBGP between all PEs) topology, there will be one export and one import RT both with the same number/identification. Other topologies may need multiple different RTs associated with a VRF. For this release, the System supports only full-meshed topology.

RD. The RD makes any customer IP prefix that needs to be shared between the PE VRFs, part of the same VPN, unique from other VPNs across the MPLS backbone. The RD is unique per VPN. The System supports RDs with a scope at the PE level, such that for a given customer VPN, each VRF in a PE that participates in that VPN will have a unique RD. The System shall maintain Type 1 RDs.

Resource Management.

This following paragraphs define the methods used by the OSS to define control parameters in exemplary embodiments to provide a flexible manner of defining the resources and the logic for dealing with these resources that provisioning assigns and manages to D&A services for customers. This will include QoS, BW, VRFs, RTs, RDs, PE service Profiles, PE sessions for IPsec and DSL remote service, and so on. BW and QoS are considered to be variable resources since they vary in amount depending on the number and size of ports in a PE. The others listed here are considered fixed resources since a PE of a given type usually has limited numbers of these resources irrespective of the amount of the PE that is equipped.

The term "configurable" as used herein means that the object defined as configurable is easily changed by the service provider, at no added charge by the vendor, and is usually GUI-supported. There will be cases, though, were the change could have such impact that the service provider will choose to re-align documentation and to do suitable testing for the change before implementation of the change. These of course would be subject to charges according to the effort required by the vendor.

Exemplary embodiments will manage BW during provisioning actions in eight capacity classes. The number of these classes is determined by the three TOS bits in IP packets (and 3 EXP bits in MPLS packets) that allow the network to differentiate the type and priority of packets. The QoS queues are the actual queues that the service provider sets up in its IP network for handling packets of different QoS characteristics in different manners to deliver the QoS the customer has purchased. There will be a very configurable method for mapping capacity classes to QoS Queues.

As used herein, the term COS (Class of Service) is distinguished from QoS (Quality of Service). COS is a WO term that defines what is the level of service that is to be provided for a given site. QoS is a provisioning and network term that specifies how the System will map this site's packets to queues in the network that will provide the requested level of service.

QoS and BW capacity. QoS and BW capacity will be managed during provisioning as follows. Access ports other than FR and ATM ports have no capacity accounting at the port level. They are of course checked for compatibility with the needs of the service requested. PEs, aggregated ports and service modules have BW capacity enforced by capacity class. SPMFs have BW capacity reported by capacity class but not enforced. Note that for BW capacity for DIA will be managed in the BW capacity mechanism as one of the services/products that the service provider offers on this IP network.

Defining the mechanism for BW capacity management. BW capacity will be allocated into capacity classes that are defined configurably as global, default parameters that can generally receive local overrides for exceptional cases. BW assignments will be controlled by these parameter definitions according to the requirements describe herein and access ports will be configured to police ingressing traffic to respect these same definitions. The following are the general features of the overall mechanism used for these purposes. The number of capacity classes is configurable but is not likely to change any time soon. The usable BW capacity of an entity will be determined by the physical or allocated BW capacity of that entity minus a configurable percentage for overhead and minus a configurable percentage for redundancy. Note that with regard to overhead, most routers do not count headers when managing traffic. Because of this, the real 'payload' of packets in a 100 Mg port can never really be 100 Mg. This difference is called 'overhead' and varies depending on the average size of packets in a given technology.

Configurable parameters are provided to specify an overhead factor per access type—PL, FR, ATM, IPSec site-to-site, IPsec remote, DSL site-to-site, DSL remote and the general redundancy factor. Each capacity class will be allocated a configurable percentage of the BW capacity of the entity being managed ranging from 0 to 100% of the usable BW capacity of that entity. For each capacity class, there will be configurable parameters to define including, but not limited to: a subscription factor (over or under subscription); a minor alert threshold; and a major alert threshold.

This set of defining and control parameters along with the implied counters is an exemplary embodiment of a mechanism that will govern BW capacity management in the system. As mentioned above, these parameters are defined once for the entire system as the global defaults across the SP IP network. However there is also the possibility of defining overrides of any of these global parameters for any given PE, SM or for any port that is managed with this mechanism. Note that subscription factors will change the system's view of the BW it has to deal with. If a given class can be oversubscribed to say 400% and the usable BW in that class for a given entity is 10 Mg, the system will consider that the entity has 40 Mg of BW. In all accounting and reporting, it will be the 40 Mg that is available or assigned, and will reported as such.

Using the BW capacity mechanism. During D&A, provisioning will use decision tables to determine the best PE, card and port to service a given request. When a port is selected to this level, the system will verify that the selected port has the BW capacity in each of the impacted capacity classes (if it is managed to that level or as a total BW if not managed to the capacity class level) and that the PE as a whole has the available capacity in its summary view of these queues. If the assignment does not involve a port but rather a service module (SM), the system checks for available capacity in the impacted queues of that service module. If the capacity is not available at these levels, the design process moves on in search of equipment that does have the required capacity. If an assignment is made but a minor or major alert threshold is crossed in doing so, the appropriate alerts and messages are issued. These thresholds will be checked at the port, PE, SM and BMF levels with each assignment. Reports are available at all these levels that will indicate the current state of fill and availability of BW as totals and as specific to each capacity class.

Capacity audits are specified that check the consistency of the system inventory of assigned services with the corresponding counters at all levels in the system to report on any discrepancies and to correct them according user's directions. These capacity audits will also make required adjustments to counters when parameters are changed that would cause the system to alter its view of this data. For example, a bad load of software might have caused the counters to be out of sync with the existing assignments. Or the service provider might have changed the mapping of a certain product to capacity classes. The audits could be use as a migration mechanism to change the allocations across the database. Of course there would be a further problem of effecting these changes in the network, but that is a different consideration.

Projecting the balance between user access and network capacity.

All PE ports that are in use (allocation status) will be designated as: access (customer facing); trunk (core network facing); and unmanaged (in use for services not managed by the System). This designation will be part of inventory management of infrastructure, provisioning and the inventory audits. Available ports will be considered as Access ports by default unless designated otherwise. The system will attempt to report on the balance of BW capacity of access from customers and trunks to the core for each PE and for the sum of all PEs in a BMF but will not do any enforcement of this during provisioning.

The total current access BW for a given PE is calculated as the sum of the following: assigned BW in ports used for private line, ATM, and FR (capacity class for this BW is known from COS mapping); the BW of ports in use that are designated as unmanaged (capacity class for this BW is designated as unknown specifically and therefore is assumed to be 'shaped' in the same proportion as the global queue BW definitions); the BW of all ports (for this PE) allocated to service modules (whether in full use of not) (capacity class for this BW is allocated according to the ratios of the current queue counts for these service modules); and the percentage of total trunk BW that is indicated as IPsec or DSL access by parameters set for this PE in inventory (capacity class for this BW is allocated according to the ratios of the current queue counts for the service modules that include this PE). The total current trunk BW for a PE is calculated as the sum of the BW of all ports in use as trunk ports minus: the percentage of total trunk BW that is indicated as IPsec or DSL access by parameters set for this PE in inventory and the percentage of the total trunk BW used for unmanaged services. This percentage is calculated as the amount of unmanaged access divided by the total managed access BW in use on the PE. BW is allocated according to the capacity class definitions for this PE described below herein. Unless overridden locally for this PE, these queue size definitions are the general default definitions that are system-wide.

Based on these calculations, the system will able to give a rough estimate of the access versus trunk BW capacity for each of the PEs in the network as total BW and as BW broken down by capacity class. All PEs in a SPMF can be summed up to the SPMF level so that the actual access BW can be compared to the actual trunk BW. Furthermore the actual trunk BW allocation by capacity class can be compared to the desired capacity class allocations. These will be the same if there are no overrides defined for any PE in a given BMF. Note that the "usable BW" (uBW) of an entity is defined as the BW of that entity after the redundancy, unmanaged and overhead factors have been removed: $uBW=[BW*(100-Redundancy)*(100-Overhead)*(100-Unmanaged)]$.

Fixed Resources. Fixed resources are those that are determined or fixed by the type of equipment that provides the resource such as number of VRFs, RTs, RDs, IPsec sessions, PPP sessions, and access queues (AQs). If a PE, card, port, or service module has any limit on the number of these resources it can support, this will be defined either as part of the template for that equipment if it has such a template or as definition parameters when the entity is defined in the inventory. If no limit is specified at a given level, it inherits the limit from the next level up for that equipment. For example, each PE type has a limited number of VRFs it can handle. It is further possible that a given card type and its ports have their own limits beyond this. Say a given PE of type x can handle 1000 VRFs, a given card might only handle 100 VRFs and each port might be limited to 3 VRFs. If the port in this case had no specific limit, it would not be tracked and only the 100 VRFs for the card would be tracked. These limits are specified in this Inventory chapter of these requirements as part of the specifications of these objects. The configurable specification of these resources and their management logic is specified below in these requirements. An example of configurable parameters would be the minor and major alert thresholds for VRFs in general.

In general, management of fixed resources is a straightforward problem of counting them as they are assigned to and released from services. A slight wrinkle comes in considering service modules (SMs). When SMs are defined, the user will specify a parameter that allocates a percentage of the fixed resources of each PE represented in that SM to the SM. These resources are deducted from the counts of the PE and considered in use as far as the PE is concerned. They become available resources for the SM and are accounted for there on a per PE basis. This is the downside of SMs. Since the SMs select PEs on a per session basis, all PEs must have the capability to handle any session. They therefore must have the configurations to handle any service assigned to the SM and this requires redundant use of these fixed resources, i.e., they have to be allocated redundantly to every PE in the SM. Note that if any ports from a PE are designated specifically as part of a SM and have specific limits on any fixed resources, these limits will be ignored by the system since it is the province of the SM to select these ports real time.

Resource Management Requirements

BW Capacity

Note that network queues are not the same as access queues (AQ) treated with the fixed Resources subsequently herein. Network queues are aggregated queues in the network core—trunk ports and trunks—and carry packets across the network. Access queues exist in dedicated access ports, police ingress packets and generally are allocated to a single VPN access at time. This latter condition can be overridden in the case of some best effort services.

Capacity Classes and Network Queues. In exemplary embodiments, the system shall provide a configurable number of capacity classes (NbCCs, default=8) and a configurable number of network queues (NbQs, default=4) that shall not exceed the number of capacity classes. Each class shall be configurably associated with exactly one queue. The numbers of classes and queues shall not be overridden locally. Note that the term "BW" unqualified by any modifiers and "theoretical BW" mean the base, physical bandwidth of an entity prior to any consideration of overhead, redundancy, and so on.

BW Capacity Accounting. The system shall keep an accounting of BW assignments by capacity class (CC) for all: aggregated ports (e.g., FR, ATM); PEs; service modules (global for the SM as a whole, and local for each BMF in which it appears); and SPMFs. Lack of available BW in requested classes at the port, PE or SM levels shall cause the assignment to fail for that entity. Lack of BW at the SPMF level shall not cause assignments to fail. Port BW shall be determined by line speed unless restricted by committed information rate (CIR), purchased partial speed or other limitation. Port BW is counted as core trunk BW if assigned as a trunk, counted assigned access BW if assigned to a dedicated access or an SM, and available access BW if not assigned or partially assigned (aggregation or limited by CIR, for example).

PE BW shall be determined by the ports assigned for use or available for use. PE Core Trunk BW shall be the sum of the BW of all trunk ports. PE available access BW shall be the sum of all available port BW. PE access BW shall be the sum of port BW assigned for access service. Allocation of Trunk BW and Available BW shall be determined by the Capacity Class parameters (defined below) that apply to this PE. Further PE considerations follow. Each PE could have ports (trunk and/or access) that are designated as "unmanaged." The BW of these ports is removed from consideration in any other categories. Each PE shall have an "unmanaged access parameter" and an "unmanaged trunk parameter." These parameters, expressed as percentages, will remove from consideration the specified proportion of the Trunk and Access BW of the PE's totals in these categories. For any service module defined on a PE, a percentage of the trunk BW may be allocated to that SM. In this case the system shall consider this BW as trunk or access according to the trunk/access ratio factor for that SM, assigned in the PE's resource reports and the access portion as assignable for the SM.

Trunk BW shall be the line speed of ports designated as trunk ports. See the definition of the non-dedicated trunk to access ratio parameter below. Service module BW shall be determined from the BW of supporting PEs as defined as a percentage of that PE's total trunk BW or from BW of specific ports defined as supporting this SM. Of the BW allocated to the SM as a percentage of a PE's trunk BW total, part shall be considered access available for assignment and part shall be considered trunk BW. The ratio of these parts to each other shall be configurably defined by the trunk/access ratio factor for that SM (defaulted to 50/50). All BW from specific ports in the SM is considered assignable access BW. SM BW shall be accounted for each SPMF where it is present and as a total of all these SPMFs presences. Only the total BW accounting shall control assignments. The per SPMF accounting shall be used for reporting and access versus trunk BW balance analysis. Note that since the BW of an SM can be based on the trunk BW of PEs, the theoretical BW of SMs shall be recalculated whenever the trunk BW of a supporting PE is changed.

Trunk BW allocated from a PE to an SM shall be considered "assigned" trunk BW for that PE in reports. Port BW allocated to an SM is considered "Assigned" BW for that PE. BW shall not be considered allocated to an SM until the equipment supporting the SM has been successfully configured for that SM (and any pre-existing services already serviced by that SM).

SPMF BW shall be determined from the PEs and SMs present in that SPMF. SPMF BW accounting shall not control assignments. The per SPMF accounting shall be used for reporting and access versus trunk BW balance analysis.

Resource Redundancy for Service Modules. The system shall assure redundancy of resources in SMs by making sure that if any PE in a SM fails, the sum of available resources allocated to this SM in other PEs is greater than or equal to the resources allocated to the SM from the failed PE. An example formula follows: 1. assume the failover/redundancy principle is that any PE can fail and the other PEs in the SM can pick up the load from that PE; and 2. assume that an SM can have any number of PEs and any number of session contributions. If SumOthers=sum of all sessions of all PEs except the largest, and SessLargest=the sessions of the largest PE/contributor, then let the SessDiff=SumOthers−SessLargest and therefore, the SumOthers−SessLargest>=0, or assumption 1 is violated, and MaxSess=SessDiff+SessLargest. The MaxSess is the number of allocatable sessions the SM has for servicing VPN Remote services while assuring failover redundancy. This same principle will work for each of the resources allocated to an SM.

BW Capacity Class Control Parameters. The system shall provide a configurable parameter to define an overhead factor for each access method—FR, ATM, PL, IPsec and DSL Remote and Site-to-Site, and a generic overhead factor. The system shall use the generic overhead factor in calculations unless another overhead factor is known to apply in a specific case. For SMs whose type is determined by the access method it supports, the overhead factor shall be the average of the overhead factors of the access methods it supports. For any port that is assigned and supports a system-known set of access methods, its overhead factor shall be the average of the overhead factors of the access methods it supports. Since overhead factors can be overridden locally, some local overhead factor will apply in specific cases. In all requirements that follow, the term "Overhead factor" shall be understood to mean the finally determined overhead percentage resulting from the considerations and calculations of this present requirement. The system shall also provide a redundancy factor and an unmanaged services factor. When the system is calculating the "usable BW" of an entity, these percentages of the physical BW shall be removed from consideration before the BW of that entity is allocated to the capacity classes as available for assignment. The usable BW (entity)=theoretical BW (entity)*[100−(overhead factor+redundancy factor+unmanaged svcs factor)] where the 3 factors shall not exceed 100.

Capacity Class (CC) Control Parameters. The system shall provide a configurable number of capacity classes (NbCCs, default=8) and a configurable number of network queues (NbQs, default=4) that shall not exceed the number of capacity classes. Each class shall be configurably associated with exactly one queue.

Each CC shall have an allocation parameter (CCnVol %) between 0 and 100% that shall determine the amount of usable BW of an entity is allocated to this CC. The sum of these parameters shall always equal 100. Each CC shall have a subscription parameter (CCnSubsc %) between 0 and 1000% that shall determine the amount of assignable BW that CC has based on its allocated BW. For this parameter, 100% is full-subscription. Less than 100% is an under-subscription constraint and over 100% is allowable over-subscription. When this parameter is not 100%, the system shall consider that total BW capacity of any entity in question is now raised or lowered as indicated. (i.e., assignable BW may be different from the physical BW.) Each CC shall have a major and a minor threshold alert parameter that the System shall use for notifications that an entity is approaching BW exhaustion.

Each CC shall also have an access queue allocation parameter (CCnAQAlloc) that can have a value from −1 to 2 that shall determine the allocation rate of access queues (AQs) in that class. For this parameter, the value: −1 shall indicate that the AQ count is kept but not controlled (no limit); 0 shall indicate there is no AQ accounting defined for this class; 1 shall indicate there is 1 to 1, assured AQ accounting defined for this class; and 2 shall indicate there is non-assured AQ accounting defined for this class.

Capacity Class Queue Parameters. The system shall provide a GUI-configurable queue marking (CCnMarking) parameter that shall determine the mapping of TOS value (0-7 currently) that the network shall use to determine the queue mapping and policing for packets ascribed to this CC. The system shall provide a GUI-configurable out of contract behavior (CCnOOCBehavior) parameter that shall determine the behavior that the network shall use for packets ascribed to this CC that exceed policed values for an assigned queue (e.g., drop, forward, remark and forward). In exemplary embodiments, these parameters shall not have local overrides.

Trunk BW—Trunk to Access Ratio. For non-dedicated services (e.g., DSL and IPSec) access to the IP Network is provided by trunks rather access circuits for customers. In order to make projections of the balance in the traffic across PEs as divided into the PE's customer access versus the PE's IP network access, this non-dedicated service must be taken into account. The system provides a non-dedicatedTrunktoAccessRatio parameter that specifies the amount of trunk BW that is considered trunk BW (i.e., BW between a PE and the IP core network) versus access (i.e., BW between a PE and a customer). Since this only applied to trunks that connect PEs to the core network, this parameter shall be defaulted to 50% and this shall mean that 50% of the trunk BW of a PE or SM is considered trunk BW and the rest is considered access BW. This parameter shall have local override capability at the PE and SM levels.

Capacity Control Parameters and Factors. All these parameters and factors shall be GUI-configurable. All these parameters and factors shall be defined once at a system wide, general default level, and shall apply in all cases throughout the system unless there is a locally defined override. Some service providers may require that these general, default parameters and factors be implemented as defaults, not as templates. This means that they will not be embedded in local records and any changes made to them will apply immediately throughout the system. No migration of data is required to implement them, although capacity audits may be required to true up accounting data to any new definitions.

The system supports GUI-supported, exceptional, configurable, local overrides for these parameters and factors unless otherwise specified. These local overrides are permitted for any port, PE or SM for which the system does BW accounting. When such a local override is defined, the system shall apply this local override instead of the corresponding general default parameter/factor. Local overrides are not affected by changes made to the corresponding general system defaults. When a local override is deleted from an entity, the corresponding general default parameter resumes its normal function for that entity. Local overrides and subscriptions factors are taken into account for any higher level entity affected by the setting or changing of these parameters such that in PE accounting, the available and assigned totals for the PE equals the sum of all access port accounting, not counting SM allocations, having taken into account all parameter settings including local overrides and subscription factors. In similar fashion, BMF accounting must always represent the sum of all access PEs in that SPMF. Capacity Audits will also assure these rules.

Example: Port BW Calculation. Suppose there is a 100 Mg. port with no local overrides and the general default settings are: overhead=3%; redundancy=25%; and unmanaged=0%. The usable BW of this port would be: 100 Mg*[100−(3+25+0)]=72 Mg. Suppose that CC3 is low latency gold with out of contract (OOC) behavior forward and CC3Vol=20%. Suppose also that CC4 is low latency silver with OOC behavior re-mark/forward and CC4Vol=20%; and that CC5 is CBW with OOC behavior re-mark/forward and CC5Vol=30%. In addition, subscription rates are 100% for CC3 and CC4, and 150% for CC5. The assignable BW of this port in CC3 would be equal to 72 Mg*20%*100%, or 14.4 Mg. For CC4 the assignable BW would be equal to 72 Mg*20%*100%=14.4 Mg. In CC5 the assignable BW would be 72 Mg*30%*150%=32.4 Mg.

Example: SM BW Calculation. Suppose an IPsec SM is defined and is allocated 25% of the trunk BW of PEx and 20% of the trunk BW of PEy. If the total trunk BW of PEx=7 Gig and PEy=10 Gig, with local overrides for CCnVol all set to 0 except CC9=100, and the General Default settings are: IpsecOverhead=2.5%; redundancy=25%; and unmanaged=0%. The theoretical BW of this SM would be: 7 Gig*25%+10 Gig*20%=3.75 Gig. The usable BW of this SM would be: 3.75 Gig*[100−(2.5+25+0)]=2,719 Mg. Since BW from PE trunk allocations is split into both trunk and access (assume 50/50), the access BW for this SM would be half of this or 1359 Mg. All of this would allocated to CC9 and if the subscription rate for this CC is 400%, there would be 5,438 Mg of assignable BW in this SM.

D&A BW Capacity Management. D&A shall manage BW capacity by calculating the impact on each capacity class for a given provisioning action. This entails using the effective BW and distributing it into class categories as defined by the capacity class control parameters. This specifies the amount of BW to be incremented or decremented in each capacity class for the object being affected. If the BW allocation is decreased in any capacity class, D&A calculates the new BW availability in that class for this entity and all higher entities. If the BW allocation is increased in any capacity class, D&A calculates availability of the BW in that class for this entity and all higher entities. If the BW is not available at the port, PE or SM global level, D&A shall fail this operation. If the BW is available at the port, PE and SM global level as applicable, the system sets up the counters to reserve the changed BW at all levels affected by the change. These counters shall be committed to the database by the calling routine. If the BW is available but crosses a minor or major alert threshold at any level, D&A shall generate the appropriate messaging and notifications. In the case where assignment of a service to a port uses part of the BW of that port and causes the rest of the BW for that port to become unusable (e.g., fractional service), the unusable portion of this BW is subtracted from or added back to the available counts for all related objects. The system shall return control to the calling routine.

Exemplary embodiments provide a flexible, parameter-driven process for defining the accounting for resources as assignment in a network are designed to provide a customer with an IP-based service. Resources are allocated to the customer's service and managed throughout the life of the service as it changes over time.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for managing access resources in a network, the method comprising:

receiving a request for Internet protocol (IP) network service at an operational support system (OSS), the request from a user device and the request including a required class of service and specifying an IP network;

accessing a storage device that specifies routers and resources available on the routers in the IP network;

selecting a router from the specified routers and a port on the selected router to perform the requested service, wherein the selecting includes verifying that the resources available on the selected router and port can perform the requested service, the verifying including verifying that one or more variable resources including bandwidth can perform the requested service, wherein the bandwidth is divided into a plurality of capacity classes and the bandwidth in each class can perform the requested service if the capacity class corresponds to the class of service;

transmitting instructions to a network configuration system associated with the IP network to initiate activation of the requested service on the selected router and port, the instructions specifying a quality of service corresponding to the required class of service, the activating performed by the network configuration system; and updating the storage device to reflect the requested service being activated on the selected router and port.

2. The method of claim 1 wherein the bandwidth is divided into less than nine capacity classes.

3. The method of claim 1, wherein the class of service is entered into the OSS by a customer service representative.

4. The method of claim 1, further comprising:

for each of the capacity classes, specifying configurable bandwidth utilization thresholds, and transmitting an alarm when the bandwidth utilization thresholds have been reached.

5. The method of claim 1 wherein the verifying that the resources available on the selected router and port can perform the requested service includes verifying that one or more fixed resources can perform the requested service.

6. The method of claim 1 wherein the router is a provider edge router.

7. The method of claim 1 wherein the requested IP network service is a data service.

8. The method of claim 1 wherein the request for IP network service is for one or more of adding a new service, a modification to an existing service and removing an existing service.

9. The method of claim 1 wherein the accessing is performed by a computer automatically in response to the receiving, the selecting is performed by the computer automatically in response to the accessing completing, and the transmitting is performed by the computer automatically in response to the selecting completing.

10. The method of claim 1 further comprising receiving a notification when the requested service has been activated on the selected router and port, wherein the updating is performed in response to receiving the notification.

11. The method of claim 1 wherein the requested service is at least one of direct Internet access and Internet protocol virtual private network.

12. The method of claim 1 wherein the requested service is for dedicated access.

13. The method of claim 1 wherein the requested service is for non-dedicated access.

14. A system for managing access resources in a network, the system comprising:

an input device for receiving a request for IP network service at an OSS, the request from a user device and the request including a required class of service and specifying an IP network;

a processor in communication with the input device including computer instructions for facilitating:

accessing a storage device that specifies routers and resources available on the routers in the IP network;

selecting a router from the specified routers and a port on the selected router to perform the requested service, wherein the selecting includes verifying that the resources available on the selected router and port can perform the requested service, the verifying including verifying that one or more variable resources including bandwidth can perform the requested service, wherein the bandwidth is divided into a plurality of capacity classes, and the bandwidth in each class can perform the requested service if the capacity class corresponds to the class of service;

updating the storage device to reflect the requested service being activated on the selected router and port; and an output device in communication with the processor for transmitting instructions to a network configuration system associated with the IP network to initiate activation of the requested service on the selected router and port, the instructions specifying a quality of service corresponding to the required class of service, the activating performed by the network configuration system.

15. The system of claim 14 wherein the router is a provider edge router.

16. The system of claim 14 wherein the requested service is at least one of direct Internet access and Internet protocol virtual private network.

17. The system of claim 14 wherein the requested service is for dedicated access.

18. The system of claim 14 wherein the requested service is for non-dedicated access.

19. A computer program product for managing access resources in a network, the computer program product comprising:

a storage medium readable by a processing circuit and storing instructions for execution by the processing circuit for facilitating a method comprising:

receiving a request for IP network service at an OSS, the request from a user device and the request including a required class of service and specifying an IP network;

accessing a storage device that specifies routers and resources available on the routers in the IP network;

selecting a router from the specified routers and a port on the selected router to perform the requested service, wherein the selecting includes verifying that the resources available on the selected router and port can perform the requested service, the verifying including verifying that one or more variable resources including bandwidth can perform the requested service, wherein the bandwidth is divided into a plurality of capacity classes, and the bandwidth in each class can perform the requested service if the capacity class corresponds to the class of service;

transmitting instructions to a network configuration system associated with the IP network to initiate activation of the requested service on the selected router and port, the instructions specifying a quality of service corresponding to the required class of service, the activating performed by the network configuration system; and updating the storage device to reflect the requested service being activated on the selected router and port.

* * * * *